(12) United States Patent
Yano et al.

(10) Patent No.: US 6,286,024 B1
(45) Date of Patent: Sep. 4, 2001

(54) HIGH-EFFICIENCY MULTIPLIER AND MULTIPLYING METHOD

(75) Inventors: Naoka Yano, Tokyo; Naoyuki Tamura, Chiba-ken, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/156,674

(22) Filed: Sep. 18, 1998

(30) Foreign Application Priority Data

Sep. 18, 1997 (JP) .................................................. 9-253970

(51) Int. Cl.[7] ..................................................... G06F 7/52
(52) U.S. Cl. ............................................................. 708/625
(58) Field of Search ..................................... 708/620, 625, 708/518

(56) References Cited

U.S. PATENT DOCUMENTS

| 4,754,421 | * | 6/1988 | Bosshart | 708/625 |
| 4,825,401 | * | 4/1989 | Ikumi | 708/625 |
| 6,014,684 | * | 1/2000 | Hoffman | 708/620 |

OTHER PUBLICATIONS

IBM Technical Disclosure Bulletin, "Pipelined Hardware Multiplier with Extended Precision", vol. 23, No. 9 Feb 1981 pp. 4322–4323.*

* cited by examiner

Primary Examiner—Tan V. Mai
(74) Attorney, Agent, or Firm—Foley & Lardner

(57) ABSTRACT

Upon execution of four sets of m/2 bit×n/2 bit multiplication, four multiplicand selectors select m/2-bit multiplicands respectively and four multiplicator selectors select corresponding n/2-bit multiplicators respectively, then the selected m/2-bit multiplicands and n/2-bit multiplicators are input into four multipliers, and then four sets of m/2 bit×n/2 bit multiplication are executed in parallel. Upon execution of m bit×n bit multiplication, the four multiplicand selectors select upper or lower m/2-bit multiplicands respectively and the four multiplicator selectors select upper or lower n/2-bit multiplicators respectively, then the selected m/2-bit multiplicands and n/2-bit multiplicators are input into the four multipliers respectively, then multiplication results of (lower m/2 bits of m bits)×(lower n/2 bits of n bits) and (upper m/2 bits of m bits)×(upper n/2 bits of n bits) out of four multiplication results of the four multipliers are connected by a connector, and then the connected multiplication results and the other two multiplication results are added by an adder with arranging in a predetermined bit location each other respectively.

2 Claims, 7 Drawing Sheets

HIGH-EFFICIENCY MULTIPLIER AND MULTIPLYING METHOD

BACKGROUND OF THE INVENTION

1. Field of the Invention

The present invention relates to a multiplier used as an arithmetic circuit such as a data processor, a microprocessor, etc. and a multiplying method which is executed in the multiplier.

2. Description of the Prior Art

In recent years, in the multimedia processing intended for audio data, image data, etc., it has been requested to execute plural sets of multiplication processes by using a bit width (e.g., 16 bit) which is smaller than a data bit width (e.g., 32 bit) of a processor. But a high-speed multiplication has its limits. Therefore, in order to execute the plural sets of multiplication, the multiplication is carried out in parallel plural times by utilizing such smaller bit width (e.g., four parallel multiplication). It is a matter of course that the multiplication in a normal bit width (e.g., 32 bit) must be also handled.

Figure 1:
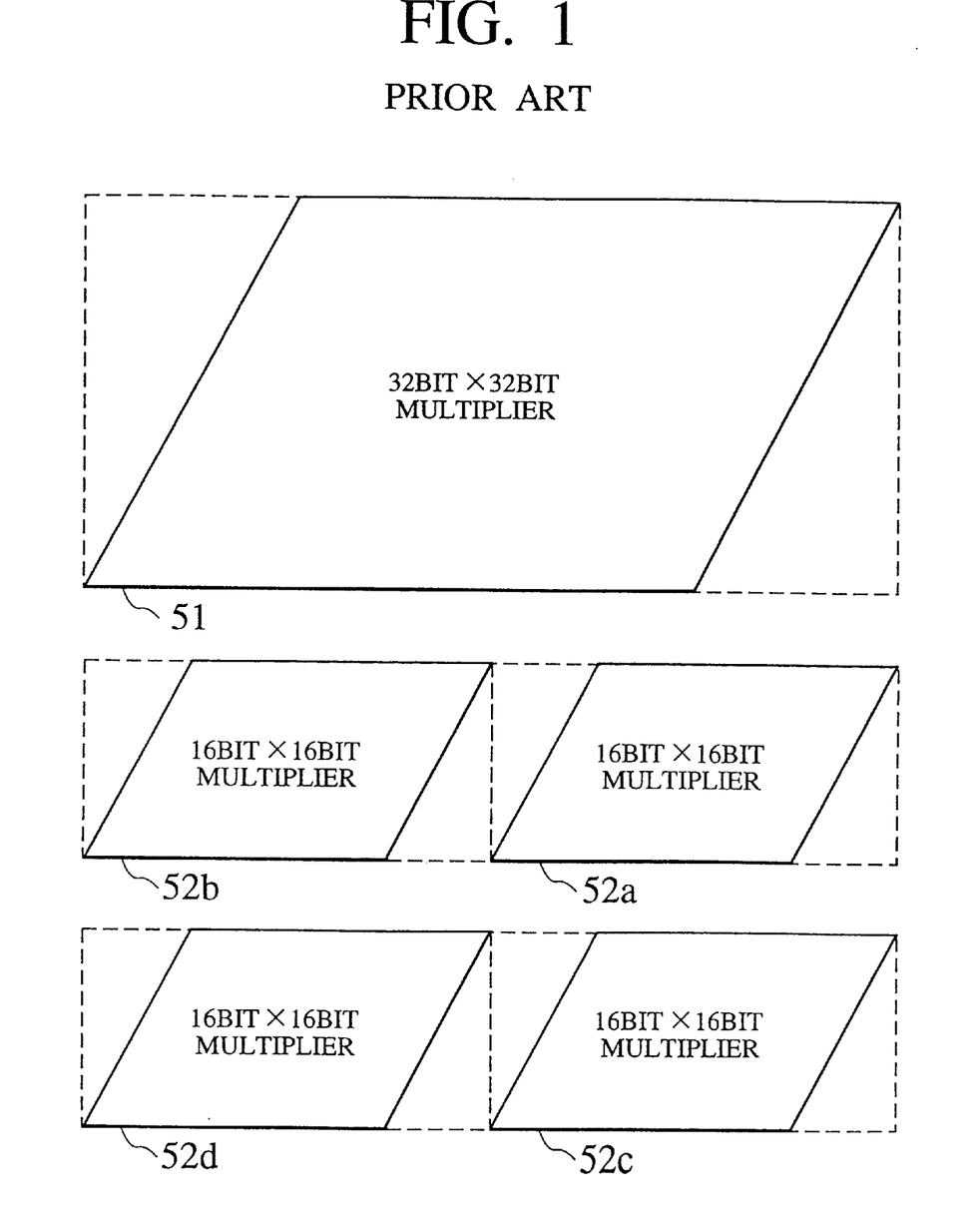
FIG. 1 is a view showing an example of a conventional circuit is equipped with a 32 bit×32 bit multiplier and parallel 16 bit×16 bit multipliers.

FIG.1 is a view showing an example of a conventional circuit which has a 32 bit×32 bit multiplication function and four sets of 16 bit×16 bit parallel multiplication function together. A 32 bit×32 bit multiplier 51 is operated to execute the 32 bit×32 bit multiplication, whereas four 16 bit×16 bit multipliers 52a, 52b, 52c, 52d are operated simultaneously to execute the four sets of 16 bit×16 bit parallel multiplication.

However, in case an occupied area of a multiplier circuit becomes an issue, all the multiplier circuits 51, 52a, 52b, 52c, 52d cannot be incorporated like the above. For this reason, the multiplication must be handled only by the 32 bit×32 bit multiplier 51.

Figure 2:
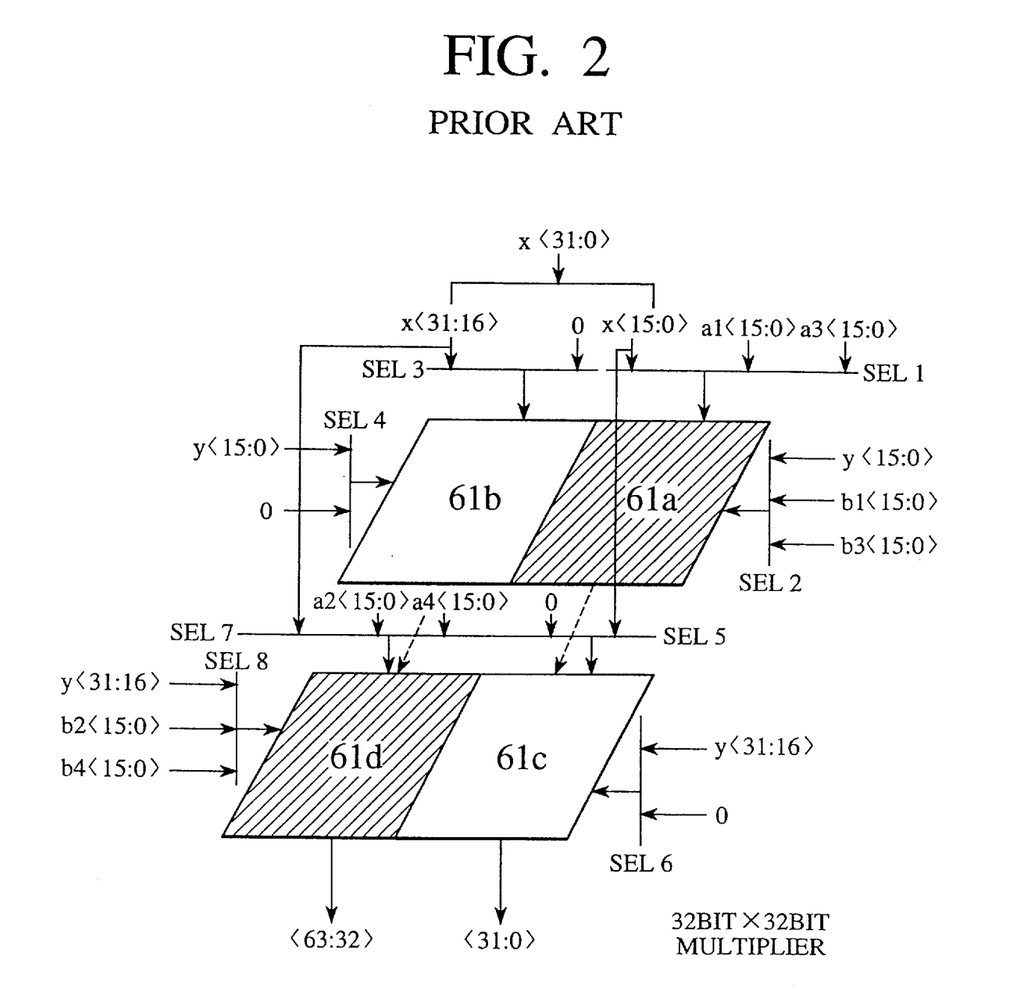
FIG. 2 is a view showing an example of a conventional circuit which executes 16 bit×16 bit multiplication and 32 bit×32 multiplication by using the 32 bit×32 bit multiplier only.

FIG.2 is a view showing an example of a conventional circuit which executes the 16 bit×16 bit multiplication and the 32 bit×32 bit multiplication by using the 32 bit×32 bit multiplier only. In order to execute the 16 bit×16 bit multiplication, the 32 bit×32 bit multiplier is separated into four multiplication blocks 61a, 61b, 61c, 61d and then the multiplication is executed by using twice the multiplication block 61a and the multiplication block 61d in which data propagation is not overlapped. Also, in order to execute the 32 bit×32 bit multiplication, the multiplier can be used as the normal 32 bit×32 bit multiplier. In both cases of the 32 bit×32 bit multiplication and the 16 bit×16 bit multiplication, outputs of the multiplication block 61c and the multiplication block 61d are outputs of the multiplication result. In this case, if the 16 bit×16 bit multiplication is to be executed, a function for cutting off carry propagation is needed between the multiplication block 61a and the multiplication block 61d not to cause interference of data.

In the following explanation, assuming that a(multiplicand)×b(multiplicator) is expressed as <(m−1):0> in m-bit data, where 0 is a least significant bit and (m−1) is a most significant bit. Assuming that, in the 32 bit×32 bit multiplication, the multiplicand of input data being represented by two's complement is expressed as x<31:0> and the multiplicator thereof is expressed y<31:0>. Also, assuming that, in four sets of the 16 bit×16 bit multiplication, the multiplicands of input data being represented by two's complement are expressed as a1<15:0>, a2<15:0>, a3<15:0>, and a4<15:0> respectively, and also the corresponding multiplicators thereof are expressed b1<15:0>, b2<15:0>, b3<15:0>, and b4<15:0> respectively.

In order to respond to four sets of the 16 bit×16 bit parallel multiplication, selectors Sel1, Sel3, Sel5, Sel7 for selecting multiplicand data and also selectors Sel2, Sel4, Sel6, Sel8 for selecting multiplicator data are attached to preceding stages of data input ports of the multiplication blocks 61a, 61b, 61c, 61d respectively.

The lower 16-bit multiplicand data x<15:0> in the 32 bit×32 bit multiplication and also the multiplicand data a1<15:0>, a3<15:0> in four sets of the 16 bit×16 bit parallel multiplication are input into the selector Sel1. The lower 16-bit multiplicator data y<15:0> in the 32 bit×32 bit multiplication and also the multiplicator data b1<15:0>, b3<15:0> in four sets of the 16 bit×16 bit parallel multiplication are input into the selector Sel2. Similarly, the upper 16-bit multiplicand data x<31:16> in the 32 bit×32 bit multiplication and 0 are input into the selector Sel3. The lower 16-bit multiplicator data y<15:0> in the 32 bit ×32 bit multiplication and 0 are input into the selector Sel4. Then, the lower 16-bit multiplicand data x<15:0> in the 32 bit×32 bit multiplication and 0 are input into the selector Sel5. The upper 16-bit multiplicator data y<31:16> in the 32 bit×32 bit multiplication and 0 are input into the selector Sel6. Similarly, the upper 16-bit multiplicand data x<31:16>in the 32 bit×32 bit multiplication and also the multiplicand data a2<15:0>, a4<15:0> in four sets of the 16 bit×16 bit parallel multiplication are input into the selector Sel7. The upper 16-bit multiplicator data y<31:16>in the 32 bit×32 bit multiplication and also the multiplicator data b2<15:0>, b4<15:0> in four sets of the 16 bit×16 bit parallel multiplication are input into the selector Sel8.

Next, an operation of the multiplier constructed as above will be explained. First, in the case of 32 bit×32 bit multiplication, in the multiplication block 61a, the multiplicand data x<15:0> is selected by the selector Sel1 and also the multiplicator data y<15:0> is selected by the selector Sel2. Similarly, in the multiplication block 61b, the multiplicand data x<31:16> is selected by the selector Sel3 and also the multiplicator data y<15:0> is selected by the selector Sel4. In the multiplication block 61c, the multiplicand data x<15:0> is selected by the selector Sel5 and also the multiplicator data y<31:16> is selected by the selector Sel6. Similarly, in the multiplication block 61d, the multiplicand data x<31:16> is selected by the selector Sel7 and also the multiplicator data y<31:16> is selected by the selector Sel8. In the same manner as in the usual case, if partial products are generated from input data and then cumulative addition of the partial products is executed, the result of 32 bit×32 bit multiplication can be derived.

Then, in the case of 16 bit×16 bit multiplication, arithmetic operation will be executed in the following order. Four sets of the 16 bit×16 bit parallel multiplication to be calculated are set in the order of multiplicand and multiplicator like a first set: a1<15, 0>, b1<15:0>, a second set: a2<15, 0>, b2<15:0>, a third set: a3<15, 0>, b3<15:0>, and a fourth set: a4<15, 0>, b4<15:0>. The first and second sets are executed in the first arithmetic cycle and then the third and fourth sets are executed in the next arithmetic cycle.

To begin with, in the first arithmetic cycle, input data are selected by the selectors Sel1, Sel2 so as to input the multiplicand a1<15, 0>, the multiplicator b1<15:0>into the multiplication block 61a. Also, input data are selected by the selectors Sel7, Sel8 so as to input the multiplicand a2<15, 0>, the multiplicator b2<15:0> into the multiplication block 61d. In this case, in order to avoid unnecessary data propagation in the cumulative addition, in the multiplication block 61b and the multiplication block 61c, input data 0 are selected as the multiplicand and the multiplicator by the selectors Sel3, Sel5 and the selectors Sel4, Sel6 respectively. In this situation, when the 32 bit×32 bit multiplication is carried out, the multiplication result of the second set: a2×b2 can be output to the upper 32-bit out of 64-bit output and also the multiplication result of the first set: a1×b1 can be output to the lower 32-bit out of the 64-bit output.

Then, in the succeeding arithmetic cycle, the multiplication results of the third set: a3×b3 and the fourth set: a4×b4 can be derived similarly. In this way, four sets of multiplication results can derived by two arithmetic cycles in total.

However, in the example shown in FIG. 1, because a number of multipliers each having a wide occupied area are provided and in addition the circuits which are not always operated depending on a command are present, the multiplier circuit is wasteful in structure. Therefore, in the event that the occupied area is made much account, such wide occupied area has becomes the very serious drawback.

In the example shown in FIG. 2, the multiplication blocks equivalent to four 16 bit×16 bit multiplication blocks have been incorporated, nevertheless two arithmetic cycles are needed in order to obtain four sets of 16 bit×16 bit multiplication results. In other words, in this example in the prior art, it is possible to say that the circuit has occupied twice areas in view of performance of the 16 bit×16 bit multiplication.

SUMMARY OF THE INVENTION

It is an object of the present invention to provide a multiplier which is capable of executing four sets of m(m is a natural number and an even number)/2 bit×n(n is a natural number and an even number)/2 bit parallel multiplication and also executing m bit×n bit multiplication, almost without increase in a circuit area and increase in calculation time by utilizing functions of a multiplier circuit effectively.

It is another object of the present invention to provide a multiplication method which is capable of executing the m bit×n bit multiplication effectively by utilizing the multiplier circuit which can execute m/2 bit×n/2 bit multiplication.

In order to achieve the above objects, according to the present invention, there is provided a multiplier comprising: four multipliers for executing m (m is a natural number and an even number)/2 bit×n (n is a natural number and an even number)/2 bit multiplication; four multiplicand selectors, respectively connected to multiplicand input sides of the four multipliers, for selecting one multiplicand from a plurality of multiplicands; four multiplicator selectors, respectively connected to multiplicator input sides of the four multipliers, for selecting one multiplicator from a plurality of multiplicators; a connector for connecting two output data out of four output data from the four multipliers; and an adder for adding the connected data from the connector and other two output data out of the four output data with arranging in a predetermined bit location each other respectively; wherein, in order to execute four sets of m/2 bit×n/2 bit multiplication, the four multiplicand selectors select m/2-bit multiplicands respectively and the four multiplicator selectors select corresponding n/2-bit multiplicators respectively, then the selected m/2-bit multiplicands and the selected n/2-bit multiplicators are input into the four multipliers, and then four sets of m/2 bit×n/2 bit multiplication are executed in parallel, and wherein, in order to execute m bit×n bit multiplication, the four multiplicand selectors select upper or lower m/2-bit multiplicands respectively and the four multiplicator selectors select upper or lower n/2-bit multiplicators respectively, then the selected m/2-bit multiplicands and the selected n/2-bit multiplicators are input into the four multipliers respectively, then multiplication results of (lower m/2 bits of m bits)×(lower n/2 bits of n bits) and (upper m/2 bits of m bits)×(upper n/2 bits of n bits) out of four multiplication results of the four multipliers are connected by the connector, and then the connected multiplication results and other two multiplication results are added by the adder with arranging in a predetermined bit location each other respectively.

According to the multiplier of the present invention, with the use of two results of the multiplication results output from four multipliers in combination, data to be added can be reduced to three in number. As a result, even if the multiplier is designed to enable execution of both four sets of m/2 bit×n/2 bit multiplication and m bit×n bit multiplication, increase in processing time can be suppressed small and there is no necessity of incorporating the m bit×n bit multiplier in addition to the m/2 bit×n/2 bit multiplier.

In order to achieve the above objects, according to the present invention, there is provided a multiplier comprising: two multipliers for executing m (m is a natural number and an even number)/2 bit×n (n is a natural number and an even number)/2 bit multiplication; two multiplicand selectors, respectively connected to multiplicand input sides of the two multipliers, for selecting one multiplicand from a plurality of multiplicands; two multiplicator selectors, respectively connected to multiplicator input sides of the two multipliers, for selecting one multiplicator from a plurality of multiplicators; a connector for connecting two output data from the two multipliers; first and second output holding circuits for respectively holding two output data from the two multipliers; a first adder for adding two output data from the first and second output holding circuits; and a second adder for adding output data from the first adder and the connected data from the connector; wherein, in order to execute four sets of m/2 bit×n/2 bit multiplication, the two multiplicand selectors select two sets of m/2-bit multiplicands respectively and the two multiplicator selectors select two sets of n/2-bit multiplicators corresponding to the two sets of m/2-bit multiplicands respectively, then the selected two sets of m/2-bit multiplicands and the selected two sets of n/2-bit multiplicators are input into the two multipliers, then two sets of m/2 bit×n/2 bit multiplication are executed in parallel, and then two output data of the two multipliers are held by the first and second output holding circuits respectively, and then the two multiplicand selectors select remaining two sets of m/2-bit multiplicands respectively and the two multiplicator selectors select remaining two sets of n/2-bit multiplicators corresponding to the remaining two sets of m/2-bit multiplicands respectively, then the selected remaining two sets of m/2-bit multiplicands and the selected remaining two sets of n/2-bit multiplicators are input into the two multipliers, and then remaining two sets of m/2 bit×n/2 bit multiplication are executed in parallel, and wherein, in order to execute m bit×n bit multiplication, a multiplicand selector connected to one multiplier selects an upper m/2-bit multiplicand and a corresponding multiplicator selector selects a lower n/2-bit multiplicator, then a multiplicand selector connected to other multiplier selects a lower m/2-bit multiplicand and a corresponding multiplicator selector selects an upper n/2-bit multiplicator, then the selected m/2-bit multiplicands and the selected n/2-bit multiplicators are input into the two multipliers respectively, then two sets of multiplication of (upper m/2 bits of m bits)×(lower n/2 bits of n bits) and (lower m/2 bits of m bits)×(upper n/2 bits of n bits) are executed in parallel, and then two output data of the two multipliers are held by the first and second output holding circuits respectively, and then the multiplicand selector connected to the one multiplier selects the lower m/2-bit multiplicand and the corresponding multiplicator selector selects the lower n/2-bit multiplicator, then the multiplicand selector connected to the other multiplier selects the upper m/2-bit multiplicand and the corresponding multiplicator selector selects the upper n/2-bit multiplicator, then the selected m/2-bit multiplicands and the selected n/2-bit multiplicators are input into the two multipliers respectively, then two sets of multiplication of (lower m/2 bits of m bits)×(lower n/2 bits of n bits) and (upper m/2 bits of m bits)×(upper n/2 bits of n bits) are executed in parallel, and then two multiplication results of the two sets of multiplication are connected by the connector and two sets of output data held by the first and second output holding circuits are added by the first adder, and an added result of the first adder and data connected by the connector are added by the second adder with arranging in a predetermined bit location each other.

According to the multiplier of the present invention, since the multipliers are reduced from four to two in number to thus execute the multiplication twice, addition of the result of two multiplying operations carried out in the first multiplication can be executed in the middle of the second multiplication.

In order to achieve the above objects, according to the present invention, there is provided a multiplier comprising: two multipliers for executing m (m is a natural number and an even number)/2 bit×n (n is a natural number and an even number)/2 bit multiplication: two multiplicand selectors, respectively connected to multiplicand input sides of the two multipliers, for selecting one multiplicand from a plurality of multiplicands; two multiplicator selectors, respectively connected to multiplicator input sides of the two multipliers, for selecting one multiplicator from a plurality of multiplicators; a connector for connecting two output data from the two multipliers; first and second output holding circuits for respectively holding two output data from the two multipliers; an adder for adding two data; an addition output holding circuit for holding addition result of the adder: and an addition input selecting circuit for selecting input data to the adder; wherein, in order to execute four sets of m/2 bit×n/2 bit multiplication, the two multiplicand selectors select two sets of m/2-bit multiplicands respectively and the two multiplicator selectors select two sets of n/2-bit multiplicators corresponding to the two sets of m/2-bit multiplicands respectively, then the selected two sets of m/2-bit multiplicands and the selected two sets of n/2-bit multiplicators are input into the two multipliers, then two sets of m/2 bit×n/2 bit multiplication are executed in parallel, and then two output data of the two multipliers are held by the first and second output holding circuits respectively, and then the two multiplicand selectors select remaining two sets of m/2-bit multiplicands respectively and the two multiplicator selectors select remaining two sets of n/2-bit multiplicators corresponding to the remaining two sets of m/2-bit multiplicands respectively, then the selected remaining two sets of m/2-bit multiplicands and the selected remaining two sets of n/2-bit multiplicators are input into the two multipliers, and then remaining two sets of m/2 bit×n/2 bit multiplication are executed in parallel, and wherein, in order to execute m bit×n bit multiplication, a multiplicand selector connected to one multiplier selects an upper m/2-bit multiplicand and a corresponding multiplicator selector selects a lower n/2-bit multiplicator, then a multiplicand selector connected to other multiplier selects an lower m/2-bit multiplicand and a corresponding multiplicator selector selects an upper n/2-bit multiplicator, then the selected m/2-bit multiplicands and the selected n/2-bit multiplicators are input into the two multipliers respectively, then two sets of multiplication of (upper m/2 bits of m bits)×(lower n/2 bits of n bits) and (lower m/2 bits of m bits)×(upper n/2 bits of n bits) are executed in parallel, and then two output data of the two multipliers are held by the first and second output holding circuits respectively, and then multiplication results held respectively by the first and second output holding circuits are selected by the addition input selecting circuit and then added by the adder, then added result is held by the addition output holding circuit, and at the same time the multiplicand selector connected to the one multiplier selects the lower m/2-bit multiplicand and the corresponding multiplicator selector selects the lower n/2-bit multiplicator, then the multiplicand selector connected to the other multiplier selects the upper m/2-bit multiplicand and the corresponding multiplicator selector selects the upper n/2-bit multiplicator, then the selected m/2-bit multiplicands and the selected n/2-bit multiplicators are input into the two multipliers respectively, then two sets of multiplication of (lower m/2 bits of m bits)×(lower n/2 bits of n bits) and (upper m/2 bits of m bits)×(upper n/2 bits of n bits) are executed in parallel, and two sets of output data held by the first and second output holding circuits are connected by the connector, and connected data output from the connector and the added result held by the addition output holding circuit are selected by the addition input selecting circuit, and then added by the adder with arranging in a predetermined bit location each other.

According to the multiplier of the present invention, since the adder can be reduced to one in number and used twice, an occupied area can be reduced smaller rather than the above multiplier.

In order to achieve the above objects, according to the present invention, there is provided a multiplication method of executing m (m is a natural number and an even number) bit×n (n is a natural number and an even number) bit multiplication, comprising the steps of: selecting upper or lower m/2 bits of mbits as multiplicands, then selecting upper or lower n/2-bits of n bits corresponding to the upper or lower m/2 bits of m bits respectively as multiplicators, then inputting the selected m/2-bits and the selected n/2-bits into multipliers which can execute m/2 bit×n/2 bit multiplication respectively, and then executing the m/2 bit ×n/2 bit multiplication, and connecting multiplication results of (lower m/2 bits of m bits)×(lower n/2 bits of n bits) and (upper m/2 bits of m bits)×(upper n/2 bits of n bits) out of four multiplication results obtained by the m/2 bit×n/2 bit multiplication, and then adding the connected multiplication results and other two multiplication results with arranging in a predetermined bit location each other respectively.

The nature, principle and utility of the invention will become more apparent from the following detailed description when read in conjunction with the accompanying drawings.

DESCRIPTION OF THE PREFERRED EMBODIMENTS

Embodiments of the present invention will be explained in detail with reference to the accompanying drawings hereinafter.

Figure 3:
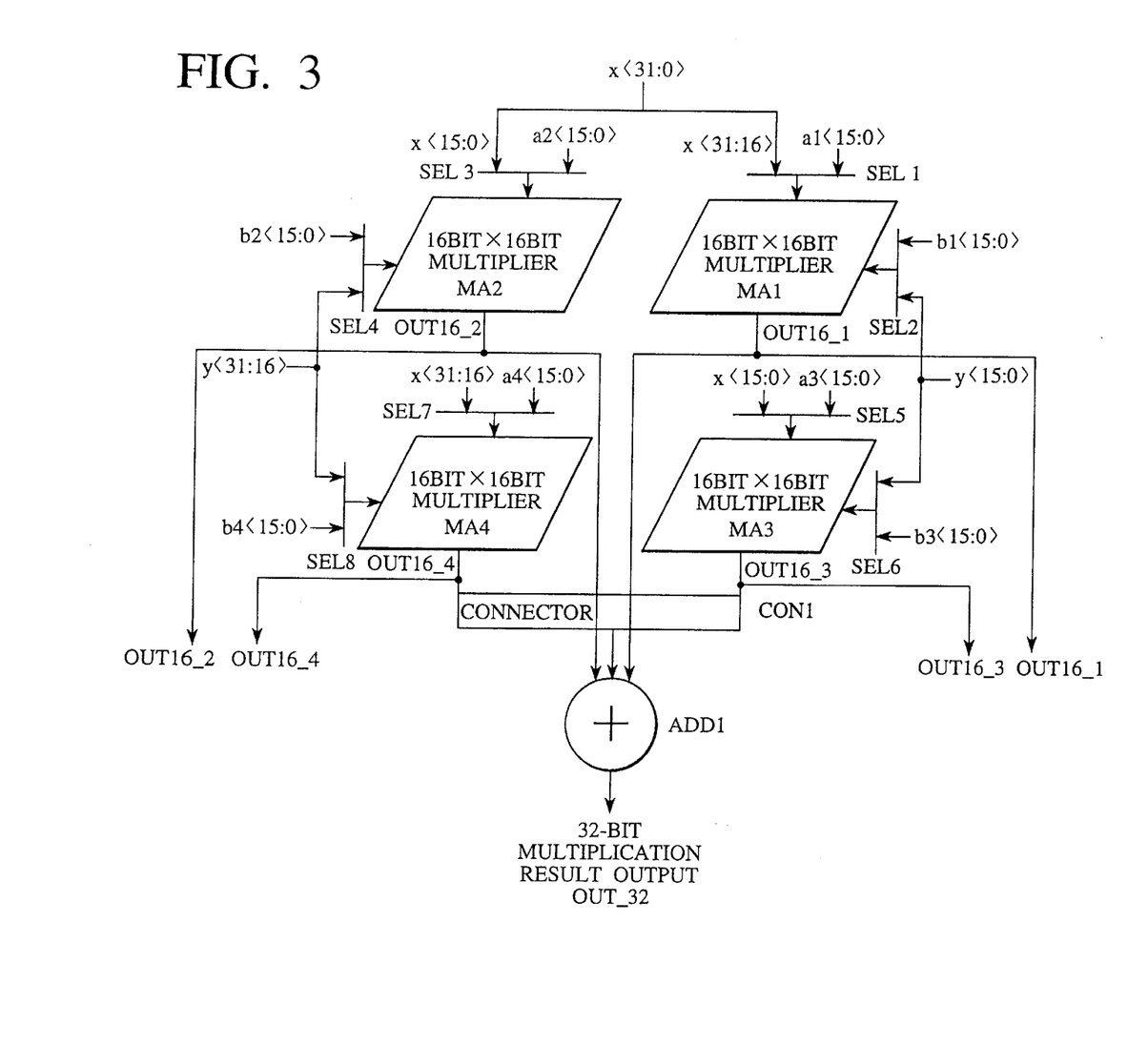
FIG. 3 is a block circuit diagram showing a multiplier according to a first embodiment of the present invention.

FIG. 3 is a block circuit diagram showing a multiplier according to a first embodiment of the present invention. First, assume that, in the 32 bit×32 bit multiplication, the multiplicand and the multiplicator of input data being represented by two's complement are expressed as x<31:0> and y<31:0> respectively. Further, assume that, in four sets of the 16 bit×16 bit parallel multiplication, the multiplicands of input data being represented by two's complement are expressed as a1<15:0>, a2<15:0>, a3<15:0>, and a4<15:0> respectively, and also the corresponding multiplicators thereof are expressed b1<15:0>, b2<15:0>, b3<15:0>, and b4<15:0> respectively.

Multipliers MA1, MA2, MA3, MA4 can execute signed and unsigned 16 bit×16 bit multiplication respectively. A selector Sel1 for selecting the multiplicand data and a selector Sel2 for selecting the multiplicator data are attached to preceding stages of data input ports of the multiplier MA1 respectively. The upper 16-bit multiplicand data x<31:16> in the 32 bit×32 bit multiplication and also the multiplicand data a1<15:0> in four sets of the 16 bit×16 bit parallel multiplication are input into the selector Sel1. The lower 16-bit multiplicator data y<15:0> in the 32 bit×32 bit multiplication and also the multiplicator data b1<15:0> in four sets of the 16 bit×16 bit parallel multiplication are input into the selector Sel2. Then, the multiplier MA1 can output an output Outl6_1.

Likewise, selectors Sel3, Sel5, Sel7 for selecting the multiplicand data and selectors Sel4, Sel6, Sel8 for selecting the multiplicator data are attached to preceding stages of data input ports of the multipliers MA2, MA3, MA4 respectively.

The lower 16-bit multiplicand data x<15:0> in the 32 bit×32 bit multiplication and also the multiplicand data a2<15:0> in four sets of the 16 bit—16 bit parallel multiplication are input into the selector Sel3. The upper 16-bit multiplicator data y<31:16> in the 32 bit×32 bit multiplication and also the multiplicator data b2<15:0> in four sets of the 16 bit×16 bit parallel multiplication are input into the selector Sel4. Then, the multiplier MA2 can output an output Outl6_2.

The lower 16-bit multiplicand data x<15:0> in the 32 bit×32 bit multiplication and also the multiplicand data a3<15:0> in four sets of the 16 bit×16 bit parallel multiplication are input into the selector Sel5. The lower 16-bit multiplicator data y<15:0> in the 32 bit×32 bit multiplication and also the multiplicator data b3<15:0> in four sets of the 16 bit×16 bit parallel multiplication are input into the selector Sel6. Then, the multiplier MA3 can output an output Outl6_3.

The upper 16-bit multiplicand data x<31:16> in the 32 bit×32 bit multiplication and also the multiplicand data a4<15:0> in four sets of the 16 bit×16 bit parallel multiplication are input into the selector Sel7. The upper 16-bit multiplicator data y<31:16> in the 32 bit×32 bit multiplication and also the multiplicator data b4<15:0> in four sets of the 16 bit×16 bit parallel multiplication are input into the selector Sel8. Then, the multiplier MA4 can output an output Outl6_4.

A connector Con1 connects the output Out 16_3 output from the multiplier MA3 with the output Out 16_4 output from the multiplier MA4 together such that the output Out 16_4 is positioned on the upper side and the output Out 16_3 is positioned on the lower side. An adder Add1 adds the above connected output, an output obtained by shifting the output Out 16_1 of the multiplier MA1 into bit positions <47:16>, and an output obtained by shifting the output Out 16_2 of the multiplier MA2 into bit positions <47:16>, and then outputs the sum.

In order to execute four sets of the 16 bit×16 bit parallel multiplication by using the above configuration, the 16-bit multiplicand data a1<15:0> and the 16-bit multiplicator data b1<15:0> are selected by the selectors Sel1 and Sel2 respectively to then input into the multiplier MA1; the 16-bit multiplicand data a2<15:0> and the 16-bit multiplicator data b2<15:0> are selected by the selectors Sel3 and Sel4 respectively to then input into the multiplier MA2; the 16-bit multiplicand data a3<15:0> and the 16-bit multiplicator data b3<15:0> are selected by the selectors Sel5 and Sel6 respectively to then input into the multiplier MA3; and the 16-bit multiplicand data a4<15:0>and the 16-bit multiplicator data b4<15:0> are selected by the selectors Sel7 and Sel8 respectively to then input into the multiplier MA4. Then, the outputs Out 16_1, Out 16_2, Out 16_3, Out 16_4 are multiplication results of the multipliers MA1, MA2, MA3, MA4 respectively.

Subsequently, the 32 bit×32 bit multiplication will be explained hereunder. At first, a product of the 32-bit multiplicand data x<31:0> and the 32-bit multiplicator data y<31:0> both being represented by two's complement can be calculated by following equations.

To begin with, using most significant bits as sign bits in the input data x, y, $$(-x_{31}*2^{31}+x_{30}*2^{30}+ \ldots +x_{16}*2^{16}+x_{15}*2^{15}+ \ldots +x_0*2^0)\times(-y_{31}*2^{31}+y_{30}*2^{30}+ \ldots +y_{16}*2^{16}+y_{15}*2^{15}+ \ldots +y_0*2^0)$$

$$=(-x_{31}*2^{15}+x_{30}*2^{14}+ \ldots +x_{16}*2^0)\times(-y_{31}*2^{15}+y_{30}*2^{14}+ \ldots +y_{16}*2^0)*2^{31}$$

$$+(-x_{31}*2^{15}+x_{30}*2^{14}+ \ldots +x_{16}*2^0)\times(y_{15}*2^{15}+y_{14}*2^{14}+ \ldots +y_0*2^0)*2^{15}$$

$$+(x_{15}*2^{15}+x_{14}*2^{14}+ \ldots +x_0*2^0)\times(-y_{31}*2^{15}+y_{30}*2^{14}+ \ldots +y_{16}*2^0)2^{15}$$

$$+(x_{15}*2^{15}+x_{14}*2^{14}+ \ldots +x_0*2^0)\times(y_{15}*2^{15}+y_{14}*2^{14}+ \ldots +y_0*2^0)$$

$$=x<15:0>xy<15:0>+x<15:0>xy<31:16>*2^{15}+x<31:16>\times y<15:0>*2^{15}+x<31:16>xy<31:16>2^{31}=Z1+Z2+Z3+Z4 \quad (A)$$

Where $Z1=x<15:0>\times xy<15:0>$, $Z2=x<15:0>\times xy<31:16>*2^{15}$, $Z3=x<31:16>\times xy<15:0>*2^{15}$, $Z4=x<31:16>\times xy<31:16>*2^{31}$.

With the above, in order to get the result of the 32 bit×32 bit multiplication: x−:0>xy<31:0>, first partial products Z1, Z2, Z3, Z4 are calculated respectively and then the sum of Z1+Z2+Z3+Z4 can be calculated.

Figure 4:
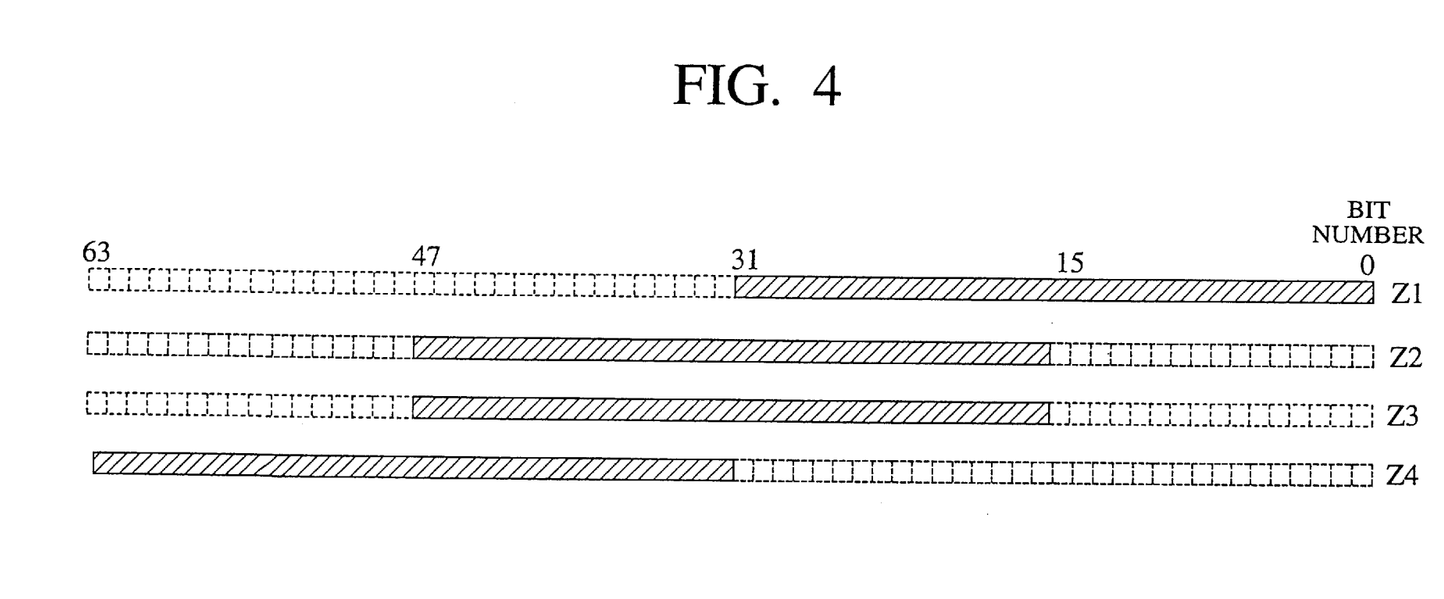
FIG. 4 is a view showing bit location of output results of parts products Z1, Z2, Z3, Z4.

FIG. 4 shows bit location of output results of the partial products Z1, Z2, Z3, Z4. As shown in FIG.4, since the bit locations of the partial products Z1 and Z4 are not overlapped at all with each other, they can be handled as one data if being connected together. More particularly, if connected data of the partial products Z1 and Z4 is assumed as Z14, the result of the 32 bit×32 bit multiplication: x<31:0>×y<31:0> can be derived by calculating Z14+Z2+Z3.

In order to render the above multipliers MA1, MA2, MA3, MA4 to calculate Z3, Z2, Z1, Z4 in FIG.3 respectively, the multiplicand data x<31:16> and the multiplicator data y<15:0> are selected by the selectors Sel1, Sel2; the multiplicand data x<15:0> and the multiplicator data y<31:16> are selected by the selectors Sel3, Sel4; the multiplicand data x<15:0> and the multiplicator data y<15:0> are selected by the selectors Sel5, Sel6; and the multiplicand data x<31:16> and the multiplicator data y<31:16> are selected by the selectors Sel7, Sel8.

At that time, according to Eq.(A), it is to be noted that both the multiplicand and the multiplicator must be handled as unsigned data in Z1, the multiplicand and the multiplicator must be handled as unsigned data and signed data (display data of two's complement) respectively in Z2, the multiplicand and the multiplicator must be handled as signed data and unsigned data respectively in Z3, and both the multiplicand and the multiplicator must be handled as signed data in Z4.

In the multiplication result in answer to the above input data, an output obtained by shifting the output Out 16_1 by a predetermined bit (16 bits), an output obtained by shifting the output Out 16_2 by the predetermined bit (16 bits), the output Out 16_3, an output obtained by shifting the output Out 16_4 by another predetermined bit (32 bits) correspond to Z3, Z2, Z1, and Z4 respectively. For this reason, the result of the 32 bit×32 bit multiplication can be derived by connecting the output Outl6_3 and the output Out 16_4 by using the connector Con1 so as to position the output Out 16_4 on the upper side and then adding the connected output, an output obtained by shifting the output Out 16_1 by a predetermined bit (16 bits), and an output obtained by shifting the output Out 16_2 by the predetermined bit (16 bits) by using the adder Add1.

The above adder Add1 is not limited to the carry propagation adder. A carry save adder may be employed as the adder Add1.

Figure 5:
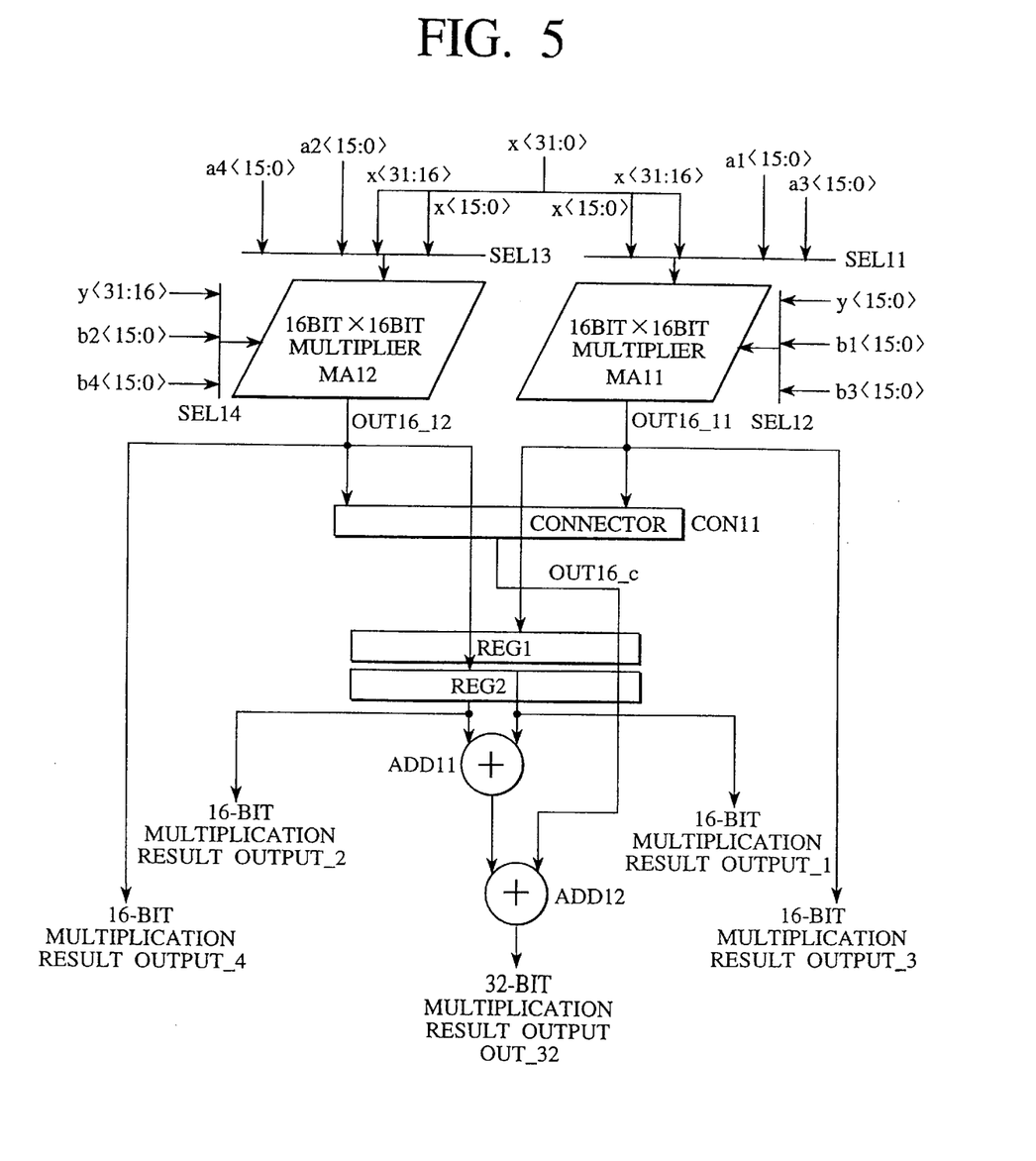
FIG. 5 is a block circuit diagram showing a multiplier according to a second embodiment of the present invention.

FIG. 5 is a block circuit diagram showing a multiplier according to a second embodiment of the present invention. Respective input data are identical to those in the first embodiment.

Multipliers MA11, MA12 execute the 16 bit×16 bit multiplication of both signed and unsigned data respectively. A selector Sel11 for selecting multiplicand data and a selector Sel12 for selecting multiplicator data are attached to preceding stages of data input ports of the multiplier MA11. The upper 16_bit multiplicand data x<31:16> and the lower 16-bit multiplicand data x<15:0> in the 32 bit×32 bit multiplication and also the multiplicand data a1<15:0>, a3<15:0> in four sets of the 16 bit×16 bit parallel multiplication are input into the selector Sel11. The lower 16-bit multiplicator data y<15:0> in the 32 bit×32 bit multiplication and also the multiplicator data b1<15:0>, b3<15:0> in four sets of the 16 bit×16 bit parallel multiplication are input into the selector Sel12. Then, the multiplier MA11 can output an output Outl6_11.

Similarly, a selector Sel13 for selecting multiplicand data and a selector Sel14 for selecting multiplicator data are attached to preceding stages of data input ports of the multiplier MA12.

The upper 16-bit multiplicand data x<31:16> and the lower 16-bit multiplicand data x<15:0> in the 32 bit×32 bit multiplication and also the multiplicand data a2<15:0>, a4<15:0> in four sets of the 16 bit×16 bit parallel multiplication are input into the selector Sel13. The upper 16-bit multiplicator data y<31:16> in the 32 bit×32 bit multiplication and also the multiplicator data b2<15:0>, b4<15:0> in four sets of the 16 bit×16 bit parallel multiplication are input into the selector Sel14. Then, the multiplier MA12 can output an output Out 16_12.

A register Reg1 holds the output Out $16_{13}$ 11 supplied from the multiplier MA11. A register Reg1 holds the output Out 16_12 supplied from the multiplier MA12. An adder Add11 adds an output of the register Reg1 and an output of the register Reg2.

A connector Con11 generates an output Out 16_c by connecting the output Out 16_11 output from the multiplier MA11 with the output Out 16_12 output from the multiplier MA12 together such that the output Out 16_12 is positioned on the upper side and the output Out 16_11 is positioned on the lower side. An adder Add12 adds the connected output Out 16_c and data being obtained by shifting the output of the adder Add11 into bit positions <47:16>, and then outputs the sum.

According to the above configuration, in order to execute four sets of the 16 bit×16 bit multiplication, following operations will be carried out by two cycle times.

First cycle: The multiplicand data a1<15:0> in the 16-bit multiplication is selected by the selector Sel11. Similarly, the multiplicator data b1<15:0> in the 16-bit multiplication, the multiplicand data a2<15:0> in the 16-bit multiplication, and the multiplicator data b2<15:0> in the 16-bit multiplication are selected by the selectors Sel12, Sel13, and Sel14 respectively.

The multipliers MA11, MA12 multiply input data and then output the results to the outputs Out 16_11, Out 16_12 respectively. Then, the registers Reg1, Reg2 hold the output results of the multipliers MA11, MA12 respectively.

Second cycle: The multiplicand data a3<15:0> in the 16-bit multiplication is selected by the selector Sel11. Similarly, the multiplicator data b3<15:0> in the 16-bit multiplication, the multiplicand data a4<15:0> in the 16-bit multiplication, and the multiplicator data b4<15:0> in the 16-bit multiplication are selected by the selectors Sel12, Sel13, and Sel14 respectively.

The multipliers MA11, MA12 multiply input data and then output the results to the outputs Out 16_11, Out 16_12 respectively. Then, four sets of output results of the 16 bit×16 bit multiplication can be derived by combining the results obtained at this time with data held by the registers Reg1, Reg2 previously.

In turn, in the case of the 32 bit×32 bit multiplication, two cycle times are needed, like the four sets of the 16 bit×16 bit multiplication.

First cycle: In order to calculate Z3 and Z2 in Eq. (A) by the multiplier MA11 and the multiplier MA12 respectively, the upper 16-bit multiplicand data x<31:16> in the 32 bit×32 bit multiplication is selected by the selector Sel11 and also the lower 16-bit multiplicator data y<15:0> in the 32 bit×32 bit multiplication is selected by the selector Sel12. Similarly, the lower 16-bit multiplicand data x<15:0> in the 32 bit×32 bit multiplication is selected by the selector Sel13 and also the upper 16-bit multiplicator data y<31:16> in the 32 bit×32 bit multiplication is selected by the selector Sel14.

The multipliers MA11, MA12 multiply input data and then output the results to the outputs Out 16_11, Out 16_12 respectively. Then, the registers Reg1, Reg2 hold the output results of the multipliers MA11, MA12 respectively.

Second cycle: In order to calculate Z1 and Z4 in Eq. (A) by the multiplier MA11 and the multiplier MA12 respectively, the lower 16-bit multiplicand data x<15:0> in the 32 bit ×32 bit multiplication is selected by the selector Sel11 and also the lower 16-bit multiplicator data y<15:0> in the 32 bit×32 bit multiplication is selected by the selector Sel12. Similarly, the upper 16-bit multiplicand data x<31:16> in the 32 bit×32 bit multiplication is selected by the selector Sel13 and also the upper 16-bit multiplicator data y<31:16> in the 32 bit×32 bit multiplication is selected by the selector Sel14.

The multipliers MA11, MA12 multiply input data and then output the results to the outputs Out 16_11, Out16_12 respectively. The connector Con11 connects the output Out 16_11 and the output Out16_12 such that the output Out16_12 is positioned on the upper side and the output Out 16_11 is positioned on the lower side, and then outputs the connected result as the output Out 16_c.

Then, the data calculated in the first cycle and held in the register Reg1 and the data calculated in the first cycle and held in the register Reg2 are added by the adder Add11. Then, the result of this addition is shifted with being of the same bit location <47:16> each other. Then, the above shifted result and the connected result Out 16_c are added by the adder Add12 to thus obtain the result of the 32 bit×32 bit multiplication.

In the second embodiment, the adder Add11 and the adder Add12 are not limited to the carry propagation adder, and the carry save adder may be employed. Although the multiplicand side has been switched while fixing the multiplicator side in the second embodiment, the same result can be obtained by switching the multiplicator side while fixing the multiplicand side.

Figure 6:
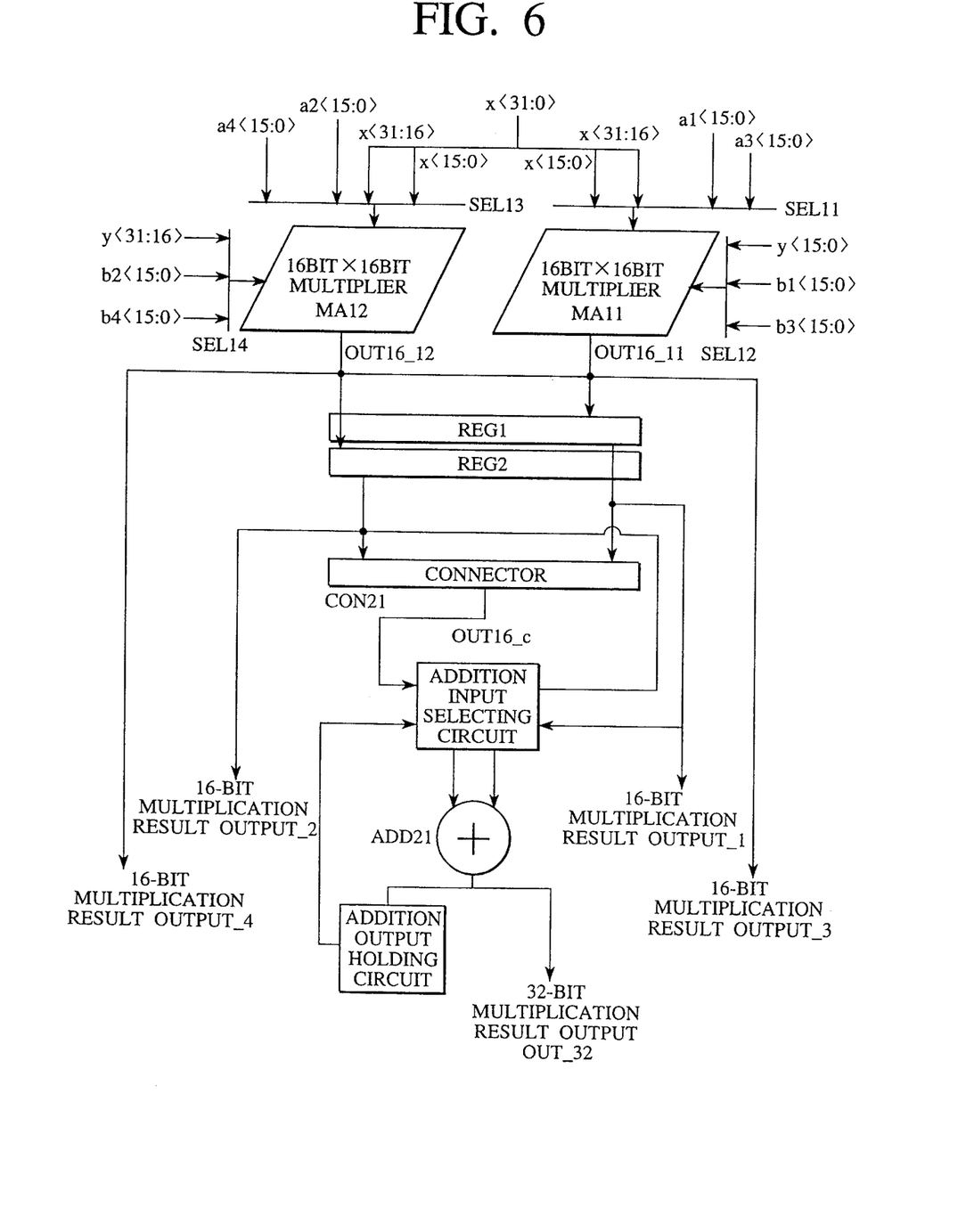
FIG. 6 is a block circuit diagram showing a multiplier according to a third embodiment of the present invention.

FIG. 6 is a block circuit diagram showing a multiplier according to a third embodiment of the present invention. In the third embodiment, the input data, and configurations of the multipliers, the connector, the registers, etc. are identical to those in the second embodiment. In the third embodiment, an addition output holding circuit and an addition input selector circuit are provided to execute functions of the adder Add11 and the adder Add12 in the second embodiment by using an adder Add21 commonly.

In the third embodiment, operations to execute four sets of the 16 bit×16 bit multiplication are similar to those in the second embodiment.

In the 32 bit×32 bit multiplication in the third embodiment, in the first cycle, the partial products Z3, Z2 are calculated by the multipliers MA11, MA12 and then held by the registers Reg1, Reg2 respectively.

In the second cycle, data held in the registers Reg1, Reg2 are selected by the addition input selector circuit and then added by the adder Add21. The added result is held by the addition output holding circuit. Then, the partial products Z1, Z4 are calculated by the multipliers MA11, MA12 and then held by the registers Reg1, Reg2 respectively.

In the third cycle, data held in the register Reg1 and data held in the register Reg2 are connected by the connector Con21 such that the output of the register Reg2 is positioned on the upper side and the output of the register Reg1 is positioned on the lower side. Then, this connected data Z14 and data obtained by shifting the added result being held by the addition output holding circuit with being of the same bit location <47:16> each other are selected by the addition input selector circuit, and then added by the adder Add21.

Figure 7:
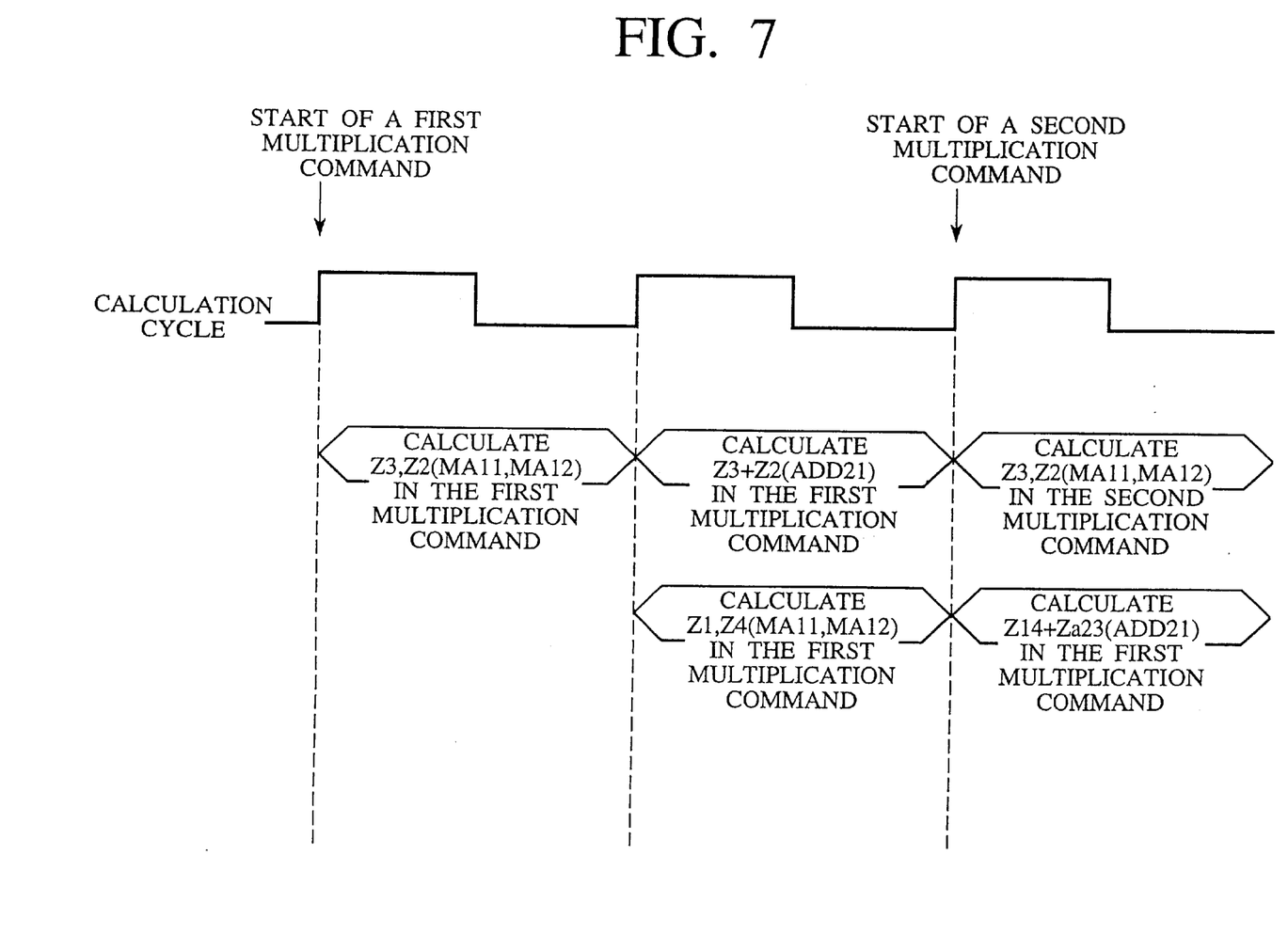
FIG. 7 is a timing chart showing a pipeline operation of the multiplier according to the third embodiment of the present invention.

FIG. 7 is a timing chart showing a pipeline operation of the multiplier according to the above third embodiment. According to start of the first multiplication command, in the first cycle, the partial products Z3, Z2 are calculated by the multipliers MA11, MA12. In the second cycle, Z3+Z2 is calculated by the adder Add21 (the added result is given by Za23) and at the same time the partial products Z1, Z4 are calculated by the multipliers MA11, MA12 respectively. In the third cycle, according to start of the second multiplication command, the partial products Z3, Z2 are calculated by the multipliers MA11, MA12 respectively and at the same time Z14+Za23 of the first multiplication command is calculated by the adder Add21. In this manner, during the multiplication processes by the multipliers MA11, MA12, addition process is carried out by the adder Add21 by using the multiplication result obtained in the preceding calculation cycle. For this reason, at the time of sequential execution, the 32 bit×32 bit multiplication can be carried out substantially every two cycles.

As explained above, the multiplier according to the first embodiment of the present invention comprises four multipliers for executing m/2 bit×n/2 bit multiplication, four multiplicand selectors for selecting one multiplicand from a plurality of multiplicands, four multiplicator selectors for selecting one multiplicator from a plurality of multiplicators, a connector for connecting two multiplication output data whose bit locations are not overlapped, and an adder for adding connected data and other two output data. Therefore, with the use of the multiplication results of four multipliers in combination, data to be added can be reduced to three in number. As a result, increase in processing time can be suppressed small even if the multiplier is designed to enable execution of both four sets of m/2 bit×n/2 bit multiplication and m bit×n bit multiplication, and increase in the occupied area can be scarcely caused since there is no necessity of incorporating the m bit×n bit multiplier in addition to the m/2 bit×n/2 bit multiplier. In other words, four sets of m/2 bit×n/2 bit multiplication and m bit×n bit multiplication can be executed, without substantial increase in calculation time, by the multiplier circuit having an occupied area which is substantially identical to that of the m bit×n bit multiplier circuit.

The multiplier according to the second embodiment of the present invention comprises two multipliers for executing m/2 bit×n/2 bit multiplication, two multiplicand selectors for selecting one multiplicand from a plurality of multiplicands, two multiplicator selectors for selecting one multiplicator from a plurality of multiplicators, a connector for connecting two multiplication output data whose bit positions are not overlapped, first and second output holding circuits for holding multiplication output data, a first adder for adding output data from the first and second output holding circuits, and a second adder for adding addition output data and connected data. Therefore, since the multipliers are reduced from four to two in number to thus execute the multiplication twice, addition of the results of two multiplying operations carried out in the first multiplication can be executed in the middle of the second multiplication. As a result, increase in adding time caused by separated operation of the m bit×n bit multiplication can be absorbed, and therefore the most efficient performance of the incorporated circuit can be brought out.

The multiplier according to the third embodiment of the present invention comprises two multipliers for executing m/2 bit×n/2 bit multiplication, two multiplicand selectors for selecting one multiplicand from a plurality of multiplicands, two multiplicator selectors for selecting one multiplicator from a plurality of multiplicators, a connector for connecting two multiplication output data whose bit positions are not overlapped, first and second output holding circuits for holding multiplication output data, an adder for adding two data, an addition output holding circuit for holding addition result, and an addition input selecting circuit for selecting input data by switching input data to the adder. Therefore, since the adder can be reduced to one in number and used twice, the occupied area of the adder can be reduced small rather than the multiplier in the second embodiment. In this case, it seems that a processing speed is apparently reduced, nevertheless the same processing speed as that in the case where two adders are incorporated can be achieved by executing the pipeline operation if the commands are sequentially executed.

It should be understood that many modifications and adaptations of the invention will become apparent to those skilled in the art and it is intended to encompass such obvious modifications and changes in the scope of the claims appended hereto.

What is claimed is:

1. A multiplier comprising:

two multipliers for executing m (m is a natural number and an even number)/2 bit×n (n is a natural number and an even number)/2 bit multiplication;

two multiplicand selectors, respectively connected to multiplicand input sides of the two multipliers, for selecting one multiplicand from a plurality of multiplicands;

two multiplicator selectors, respectively connected to multiplicator input sides of the two multipliers, for selecting one multiplicator from a plurality of multiplicators;

a connector for connecting two output data from the two multipliers;

first and second output holding circuits for respectively holding two output data from the two multipliers;

a first adder for adding two output data from the first and second output holding circuits; and a second adder for adding output data from the first adder and the connected data from the connector;

wherein, in order to execute four sets of m/2 bit×n/2 bit multiplication, the two multiplicand selectors select two sets of m/2-bit multiplicands respectively and the two multiplicator selectors select two sets of n/2-bit multiplicators corresponding to the two sets of m/2-bit multiplicands respectively, then the selected two sets of m/2-bit multiplicands and the selected two sets of n/2-bit multiplicators are input into the two multipliers, then two sets of m/2 bit×n/2 bit multiplication are executed in parallel, and then two output data of the two multipliers are held by the first and second output holding circuits respectively, and then the two multiplicand selectors select remaining two sets of m/2-bit multiplicands respectively and the two multiplicator selectors select remaining two sets of n/2-bit multiplicators corresponding to the remaining two sets of m/2-bit multiplicands respectively, then the selected remaining two sets of m/2-bit multiplicands and the selected remaining two sets of n/2-bit multiplicators are input into the two multipliers, and then remaining two sets of m/2 bit×n/2 bit multiplication are executed in parallel, and wherein, in order to execute mbit×n bit multiplication, a multiplicand selector connected to one multiplier selects an upper m/2-bit multiplicand and a corresponding multiplicator selector selects a lower n/2-bit multiplicator, then a multiplicand selector connected to other multiplier selects a lower m/2-bit multiplicand and a corresponding multiplicator selector selects an upper n/2-bit multiplicator, then the selected m/2-bit multiplicands and the selected n/2-bit multiplicators are input into the two multipliers respectively, then two sets of multiplication of (upper m/2 bits of m bits)×(lower n/2 bits of n bits) and (lower m/2 bits of m bits)×(upper n/2 bits of n bits) are executed in parallel, and then two output data of the two multipliers are held by the first and second output holding circuits respectively, and then the multiplicand selector connected to the one multiplier selects the lower m/2-bit multiplicand and the corresponding multiplicator selector selects the lower n/2-bit multiplicator, then the multiplicand selector connected to the other multiplier selects the upper m/2-bit multiplicand and the corresponding multiplicator selector selects the upper n/2-bit multiplicator, then the selected m/2-bit multiplicands and the selected n/2-bit multiplicators are input into the two multipliers respectively, then two sets of multiplication of (lower m/2 bits of m bits)×(lower n/2 bits of n bits) and (upper m/2 bits of m bits)×(upper n/2 bits of n bits) are executed in parallel, and then two multiplication results of the two sets of multiplication are connected by the connector and two sets of output data held by the first and second output holding circuits are added by the first adder, and an added result of the first adder and data connected by the connector are added by the second adder with arranging in a predetermined bit location each other.

2. A multiplier comprising:

two multipliers for executing m (m is a natural number and an even number)/2 bit×n (n is a natural number and an even number)/2 bit multiplication;

two multiplicand selectors, respectively connected to multiplicand input sides of the two multipliers, for selecting one multiplicand from a plurality of multiplicands;

two multiplicator selectors, respectively connected to multiplicator input sides of the two multipliers, for selecting one multiplicator from a plurality of multiplicators;

a connector for connecting two output data from the two multipliers;

first and second output holding circuits for respectively holding two output data from the two multipliers;

an adder for adding two data;

an addition output holding circuit for holding addition result of the adder; and an addition input selecting circuit for selecting input data to the adder;

wherein, in order to execute four sets of m/2 bit×n/2 bit multiplication, the two multiplicand selectors select two sets of m/2-bit multiplicands respectively and the two multiplicator selectors select two sets of n/2-bit multiplicators corresponding to the two sets of m/2-bit multiplicands respectively, then the selected two sets of m/2-bit multiplicands and the selected two sets of n/2-bit multiplicators are input into the two multipliers, then two sets of m/2 bit×n/2 bit multiplication are executed in parallel, and then two output data of the two multipliers are held by the first and second output holding circuits respectively, and then the two multiplicand selectors select remaining two sets of m/2-bit multiplicands respectively and the two multiplicator selectors select remaining two sets of n/2-bit multiplicators corresponding to the remaining two sets of m/2-bit multiplicands respectively, then the selected remaining two sets of m/2-bit multiplicands and the selected remaining two sets of n/2-bit multiplicators are input into the two multipliers, and then remaining two sets of m/2 bit×n/2 bit multiplication are executed in parallel, and wherein, in order to execute m bit×n bit multiplication, a multiplicand selector connected to one multiplier selects an upper m/2-bit multiplicand and a corresponding multiplicator selector selects a lower n/2-bit multiplicator, then a multiplicand selector connected to other multiplier selects an lower m/2-bit multiplicand and a corresponding multiplicator selector selects an upper n/2-bit multiplicator, then the selected m/2-bit multiplicands and the selected n/2-bit multiplicators are input into the two multipliers respectively, then two sets of multiplication of (upper m/2 bits of m bits)×(lower n/2 bits of n bits) and (lower m/2 bits of m bits)×(upper n/2 bits of n bits) are executed in parallel, and then two output data of the two multipliers are held by the first and second output holding circuits respectively, and then multiplication results held respectively by the first and second output holding circuits are selected by the addition input selecting circuit and then added by the adder, then added result is held by the addition output holding circuit, and at the same time the multiplicand selector connected to the one multiplier selects the lower m/2-bit multiplicand and the corresponding multiplicator selector selects the lower n/2-bit multiplicator, then the multiplicand selector connected to the other multiplier selects the upper m/2-bit multiplicand and the corresponding multiplicator selector selects the upper n/2-bit multiplicator, then the selected m/2-bit multiplicands and the selected n/2-bit multiplicators are input into the two multipliers respectively, then two sets of multiplication of (lower m/2 bits of m bits)×(lower n/2 bits of n bits) and (upper m/2 bits of m bits)×(upper n/2 bits of n bits) are executed in parallel, and two sets of output data held by the first and second output holding circuits are connected by the connector, and connected data output from the connector and the added result held by the addition output holding circuit are selected by the addition input selecting circuit, and then added by the adder with arranging in a predetermined bit location each other.

* * * * *